United States Patent
Wolf

(10) Patent No.: US 10,375,180 B2
(45) Date of Patent: Aug. 6, 2019

(54) FOLLOWING CONTENT POSTING ENTITIES

(71) Applicant: INTERNATIONAL BUSINESS MACHINES CORPORATION, Armonk, NY (US)

(72) Inventor: Tracee L. Wolf, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 717 days.

(21) Appl. No.: 13/852,452

(22) Filed: Mar. 28, 2013

(65) Prior Publication Data

US 2014/0297741 A1 Oct. 2, 2014

(51) Int. Cl.
*H04L 29/08* (2006.01)
*G06Q 50/00* (2012.01)
*G06Q 10/10* (2012.01)

(52) U.S. Cl.
CPC .............. *H04L 67/18* (2013.01); *G06Q 10/10* (2013.01); *G06Q 50/01* (2013.01)

(58) Field of Classification Search
CPC ......... H04L 67/18; G06Q 10/10; G06Q 50/01
USPC ................................................ 709/204–206
See application file for complete search history.

(56) References Cited

U.S. PATENT DOCUMENTS

| | | | |
|---|---|---|---|
| 6,571,234 B1* | 5/2003 | Knight | G06Q 10/10 709/206 |
| 7,069,308 B2 | 6/2006 | Abrams | |
| 7,386,798 B1* | 6/2008 | Heikes | G06Q 10/10 715/752 |
| 8,782,157 B1* | 7/2014 | Hansen | H04L 51/12 709/206 |
| 8,874,781 B2* | 10/2014 | Khorashadi | H04H 60/25 709/232 |
| 9,152,722 B2* | 10/2015 | Sahni | G06F 17/30876 |
| 9,326,029 B2* | 4/2016 | Prins | H04N 21/432 |
| 2007/0162566 A1* | 7/2007 | Desai | G06F 17/3089 709/219 |
| 2007/0214097 A1* | 9/2007 | Parsons | G06F 17/30864 706/12 |
| 2007/0266097 A1* | 11/2007 | Harik | G06Q 30/02 709/204 |
| 2008/0270908 A1* | 10/2008 | Hope | G06F 17/30861 715/733 |
| 2010/0042618 A1 | 2/2010 | Rinearson et al. | |

(Continued)

FOREIGN PATENT DOCUMENTS

WO 2008027924 A2 3/2008

*Primary Examiner* — Minh Chau Nguyen
(74) *Attorney, Agent, or Firm* — Richard A. Wilhelm

(57) ABSTRACT

A method, system, and/or computer program product enables a user to selectively follow content postings from a content posting entity. A set of desired content posting entity traits describes traits of an ideal content posting entity that the content follower desires to follow. The set of desired content posting entity traits is compared to traits of a first candidate content posting entity. In response to the traits of the first candidate content posting entity matching the desired content posting entity traits, and in response to the first candidate content posting entity posting from a preselected location, the first candidate content posting entity is selected for future content postings to be sent to the content follower.

20 Claims, 3 Drawing Sheets

(56) References Cited

U.S. PATENT DOCUMENTS

| | | | |
|---|---|---|---|
| 2010/0306249 A1* | 12/2010 | Hill | G06F 17/30867 |
| | | | 707/769 |
| 2010/0306672 A1 | 12/2010 | McEniry | |
| 2011/0196802 A1* | 8/2011 | Ellis | G06F 17/30654 |
| | | | 705/321 |
| 2011/0264596 A1 | 10/2011 | Shifflett | |
| 2012/0005224 A1* | 1/2012 | Ahrens | G06Q 10/10 |
| | | | 707/769 |
| 2012/0201362 A1* | 8/2012 | Crossan | G10L 15/26 |
| | | | 379/88.01 |
| 2013/0041898 A1* | 2/2013 | Ishida | G06F 17/3089 |
| | | | 707/736 |
| 2013/0073388 A1* | 3/2013 | Heath | G06Q 50/01 |
| | | | 705/14.53 |
| 2013/0073389 A1* | 3/2013 | Heath | G06Q 30/02 |
| | | | 705/14.54 |
| 2014/0108441 A1* | 4/2014 | Samari | G06F 17/30551 |
| | | | 707/758 |
| 2014/0278896 A1* | 9/2014 | Anand | G06Q 30/0246 |
| | | | 705/14.32 |

\* cited by examiner

FOLLOWING CONTENT POSTING ENTITIES

BACKGROUND

The present disclosure relates to the field of computers, and specifically to the use of computers for posting and retrieving content postings. Still more particularly, the present disclosure relates to aiding a content follower in selecting a content posting entity to follow.

Computer and smartphone users often post information about a particular subject, which may be themselves, a particular topic, specific issues, or general mental ruminations. Such information is known as a "posting". A posting may be to a web log (blog), which is a frequently updated entry on a webpage (e.g., on a social networking service), or it may be to a microblog, which is limited in characters and often sent from a smart phone. Users often request that they automatically receive postings from a particular source (i.e., person) from the service that hosts the postings. These users are known as "content followers".

SUMMARY

A method, system, and/or computer program product enables a user to selectively follow content postings from a content posting entity. A set of desired content posting entity traits describes traits of an ideal content posting entity that the content follower desires to follow. The set of desired content posting entity traits is compared to traits of a first candidate content posting entity. In response to the traits of the first candidate content posting entity matching the desired content posting entity traits, and in response to the first candidate content posting entity posting from a preselected location, the first candidate content posting entity is selected for future content postings to be sent to the content follower. In response to traits of a second candidate content posting entity matching more of the desired content posting entity traits than those of the first candidate content posting entity, postings to the content follower from the first candidate content posting entity are blocked and future content postings from the second candidate content posting entity are sent to the content follower.

DETAILED DESCRIPTION

Figure 1:
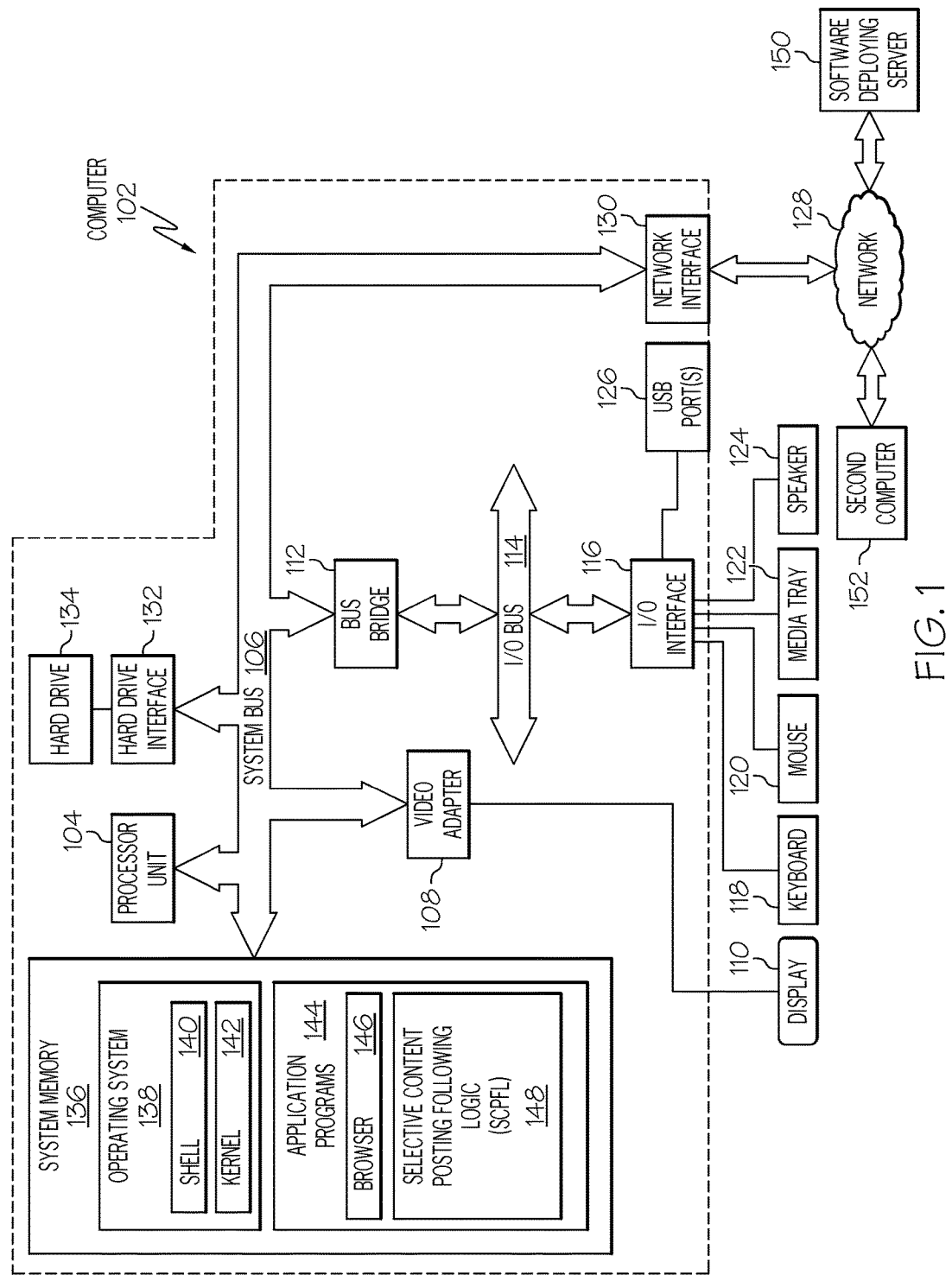
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a second computer 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as second computer 152.

Application programs 144 in computer 102's system memory (as well as software deploying server 150's system memory) also include a selective content posting following logic (SCPFL) 148. SCPFL 148 includes code for implementing the processes described below, including those described in FIGS. 2-3. In one embodiment, computer 102 is able to download SCPFL 148 from software deploying server 150, including in an on-demand basis, wherein the code in SCPFL 148 is not downloaded until needed for execution. Note further that, in one embodiment of the present invention, software deploying server 150 performs all of the functions associated with the present invention (including execution of SCPFL 148), thus freeing computer 102 from having to use its own internal computing resources to execute SCPFL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
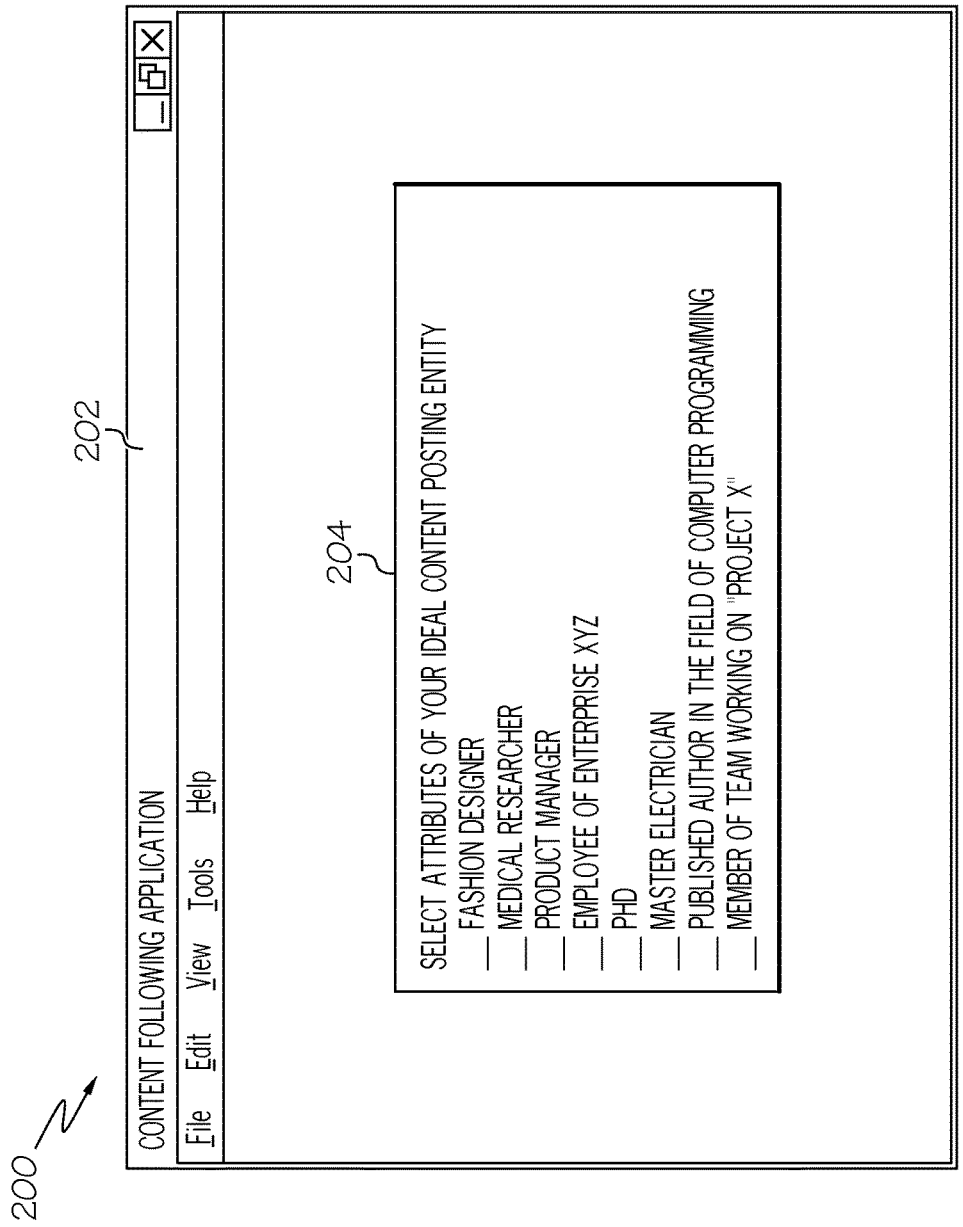
FIG. 2 illustrates an exemplary user interface (UI) that enables a user to select features of an ideal content posting entity which the user desires to follow.

With reference now to FIG. 2, an exemplary user interface (UI) 200 that enables a user to select features of an ideal content posting entity to which the user desires to follow. As depicted, a Content Following Application 202 (e.g., part of SCPFL 148 shown in FIG. 1), presents a set of options 204 to a user. These options 204 allow the user to select the attributes of an ideal content posting entity that he/she wishes to "follow" in that entity's content postings (i.e., blog entries, micro-blog entries, publicly broadcast content from radio, podcasts, etc.). That is, the user may desire to follow an entity having a particular occupation (e.g., fashion designer, medical researcher), job title (e.g., product manager), employer (e.g., Enterprise XYZ), education level (e.g., PhD), certification (e.g., Master electrician), accomplishments (e.g., Published author in some particular field/ subject area), work history (e.g., on the team that is working on "Project X"), how often the entity posts content (e.g., at least once a week, in order to identify a content poster who is current and active, or no more than twice a week, in order to avoid a poster who overloads a "follower's" device with excessive postings), etc. In one embodiment, the user is able to input other user-defined traits/topics in an active field 206, whose inputs are processed in a manner similar to those predefined fields that are selected by the user.

Based on which attribute or combination of attributes is selected by the user, SCPFL 148 will identify (e.g., by matching metadata/flags/etc. associated with posting of various entities) which content posting entity best fits the user's ideal content posting entity. This identified entity will then be "followed by" the user (i.e., the postings of this identified entity will be automatically sent to the user). Note that the identified entity may post content on a network-linked computer. For example, the content follower may use computer 102 shown in FIG. 1, while the content posting entity may post his content on a webpage, social network application, microblogging application, etc. using the second computer 152 shown in FIG. 2. The network 128 shown in FIG. 1 may be a local area network, the Internet, etc., and/or in the case of second computer 152 being a smart phone, network 128 may be a combination of cell phone networks and the Internet. Similarly, if computer 102 and second computer 152 are both smart phones, network 128 may simply be a cell phone network.

Figure 3:
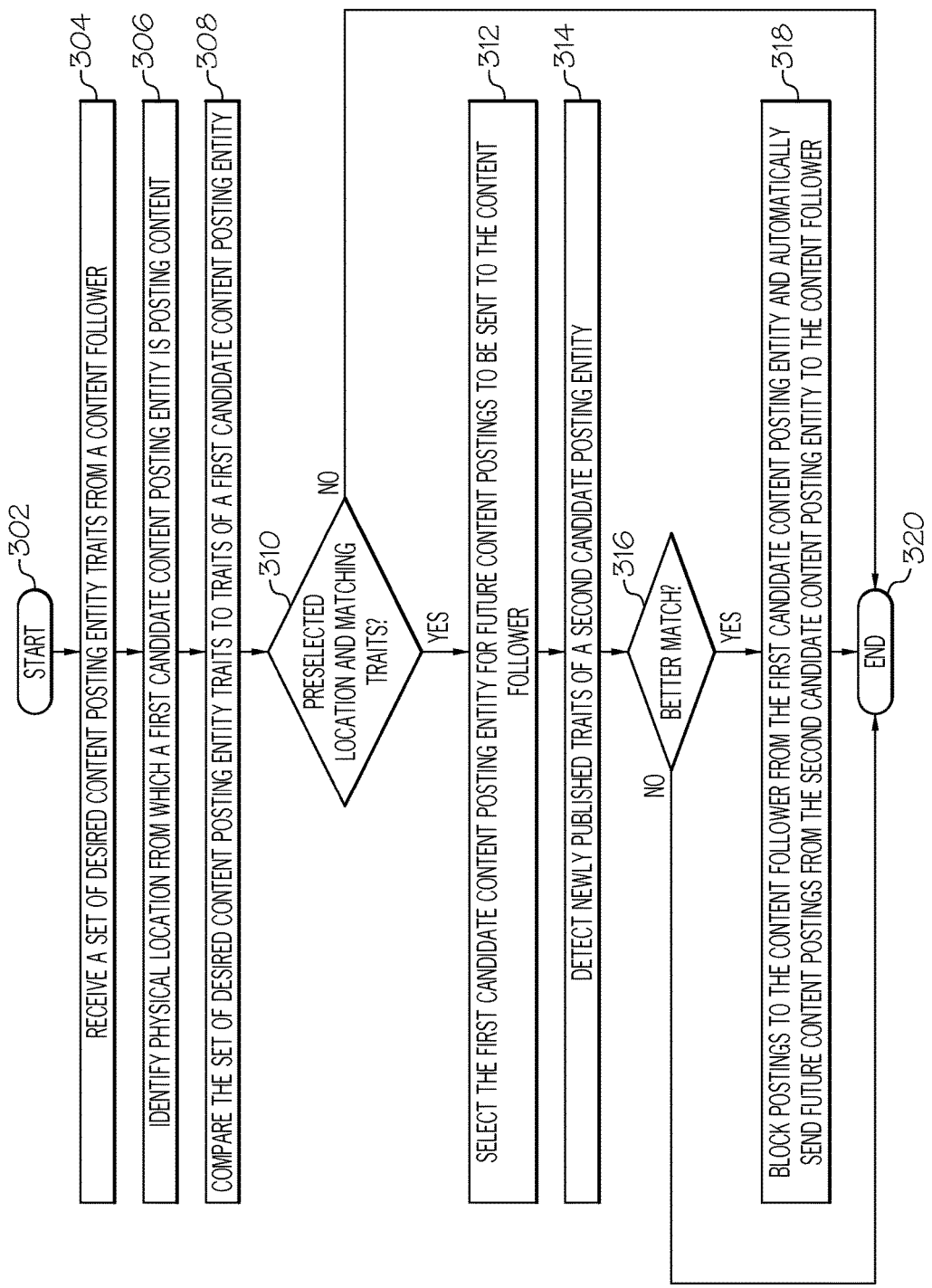
FIG. 3 is a high level flow chart of one or more exemplary steps taken by one or more processors to enable a user to selectively follow content postings from a content posting entity.

With reference now to FIG. 3, a high level flow chart of one or more exemplary steps taken by one or more processors to enable a user to selectively follow content postings from a content posting entity is presented. After initiator block 302, a set of desired content posting entity traits is received from a potential content follower (block 304). These desired content posting entity traits may be input into a UI, such as the UI 200 shown in FIG. 2. As described herein, the set of desired content posting entity traits describes traits of an ideal content posting entity that the content follower desires to follow. That is, the user does not know the identity of a particular content posting entity at this point, but rather only knows what the ideal content posting entity will "look like" (i.e., what traits are held by the ideal content posting entity).

As described in block 306, a first candidate content posting entity, who possesses the traits specified by the user of the UI, is identified. In one embodiment, the physical location from which that first candidate content posting entity is posting content is also identified. As described in block 308, a comparison is then made of the set of desired content posting entity traits (e.g., which were input by the user into the UI 200 shown in FIG. 2) to traits of the first candidate content posting entity (as identified by metadata, flags, or any other type of identification information associated with that entity and/or his/her content posting location, such as a webpage, microblogging account, etc.).

As depicted in query block 310, a query is made to determine whether the first candidate content posting entity matches more than a predetermined percentage of the desired content posting entity traits, and whether the first candidate content posting entity is posting from a preselected location that has been identified by the user. That is, a determination is made as to whether the first candidate content posting entity 1) possesses the desired traits specified by the user who might be interested in following his/her postings, and 2) is posting from a physical location (i.e., a particular building, geographic region, etc.) that the user has selected. These two attributes respectively allow the user to follow a content posting entity who 1) posts content that is of interest to the user, and 2) is within a physical proximity that the user desires (i.e., the user and content poster are near one another to encourage close collaboration, or are far apart to ensure desired levels of security/isolation/non-collaboration/etc.). If the first candidate content posting entity meets these parameters, then postings from the first candidate content posting entity are sent to the content follower (block 312).

Thus, in one embodiment, a user may desire to receive content postings from a content poster that he/she does not see on a daily basis (due to their physical separation in different buildings/cities/countries/etc.), while in another embodiment the user may desire to receive content postings from a content poster who is in close physical proximity (e.g., the user and content poster are working on a same project). Similarly, in another embodiment, a user may desire to block content postings from a content poster that he/she does not see on a daily basis (e.g., to ensure that their respective research remains truly "independent"), while in another embodiment the user may desire to block content postings from a content poster who is in close physical proximity (e.g., the user and content poster are already verbally discussing issues related to a project on which they are both working).

As described in block 314, a second candidate posting entity is identified. This second candidate posting entity is identified as an entity who has updated his/her published traits, which might make for a better match to what the user is looking for. Note that these newly published traits are published after the first candidate content posting entity was selected. As described in query block 316, if the second candidate posting entity is a better match to what the user is looking for (i.e., the second candidate content posting entity matches more of the desired content posting entity traits than previously published traits of the first candidate content), then postings to the content follower from the first candidate content posting entity are automatically blocked, and future content postings from the second candidate content posting entity are automatically sent to the content follower (block 318). The process ends at terminator block 320.

Note that the traits of the user and the content posting entity may or may not be the same, according to various embodiments of the present invention. For example, assume that a comparison is made between a particular content posting entity's traits and traits of the content follower. That is, the particular content posting entity's traits describe traits of the particular content posting entity; a content follower's traits describe traits of the content follower; and the particular content posting entity's traits and the content follower's traits describe a same predefined set of types of traits (i.e., categories of traits, although not the traits themselves). That is, the set of types of traits describe generic categories (i.e., education, location, job title) but not the trait itself (e.g., PhD, "Building A", project manager). In one embodiment, if the user and the content poster have the same traits, the user will follow the postings of the content poster (i.e., in response to the particular content posting entity's traits matching the content follower's traits at a predefined matching level (e.g., there is a 90% or greater match), retrieving content postings from the particular content posting entity for the content follower). This embodiment allows a user to follow entities who are similar to him/her.

In another embodiment, the user may want to follow someone who is unlike him/her. In this embodiment, if the user and the content poster fail to match at some predetermined level (e.g., 95% of their traits fail to match), then the user will follow the postings of that content poster (i.e., in response to the particular content posting entity's traits failing to match the content follower's traits at a predefined matching level, retrieving content postings from the particular content posting entity for the content follower).

In another embodiment, the user may want to ensure that he/she does not follow content posting entities who are too similar in nature to him/her. For example, a user may be a researcher, who wants to maintain a wall between himself and other researchers in his field, in order to ensure there is no chance of inadvertent misuse of discoveries by those other researchers. In this embodiment, if the user's traits are too closely aligned with another researcher (who is a content poster), then the system will automatically block those postings from the user (i.e., in response to the particular content posting entity's traits matching the content follower's traits at a predefined matching level (e.g., more than 75% of their traits match), blocking a retrieval of content postings from the particular content posting entity for the content follower).

As describe above in FIG. 2, in various embodiments, the set of desired content posting entity traits may describe a specific area of expertise held by a particular posting entity; a specific education level held by a particular posting entity; a specific professional certification held by a particular posting entity; a specific job title held by a particular posting entity; a specific enterprise by whom a particular posting entity is employed; a specific project team of which a particular posting entity is a member; and/or any other parameter desired by the user.

As described herein, the present invention provides a novel model of content posting following that is more efficient to the end user and enterprise than having to know the name and location of a posting entity in order to follow that content poster. The present invention allows users to follow others who fit a description or possess quality traits that they identify as being relevant to their own interests. Thus, the present invention enables end users to follow people who are tagged with certain metadata in content posting systems. In one embodiment, people can tag themselves (on their profiles) with certain key words that describe their expertise and/or interests. In another embodiment, other people can also provide metadata tags on a person.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of enabling a user to selectively follow content postings from a content posting entity, the method comprising:
   comparing, by one or more processors, a particular content posting entity's traits of a particular content posting entity to a content follower's traits of a content follower, wherein the particular content posting entity's traits and the content follower's traits describe a same predefined set of types of traits;
   in response to the particular content posting entity's traits matching the content follower's traits within a predefined matching level range, automatically retrieving, by one or more processors, content postings from the particular content posting entity for the content follower; and
   transmitting, by one or more processors, the content postings from the particular content posting entity to a computer system that is used by the content follower.

2. The method of claim 1, wherein the content postings are entries to a web log (blog).

3. The method of claim 1, wherein the predefined matching level range is above a predetermined matching level.

4. The method of claim 1, wherein the predefined matching level range is below a predetermined matching level.

5. The method of claim 1, wherein the same predefined set of types of traits describes a specific area of expertise held by both the particular content posting entity and the content follower.

6. The method of claim 1, wherein the same predefined set of types of traits describes a specific education level held by both the particular content posting entity and the content follower.

7. The method of claim 1, wherein the particular content posting entity's traits are identified by metadata that is tagged to the content postings that are posted by the particular content posting entity.

8. The method of claim 1, wherein the same predefined set of types of traits describes a specific job title held by both the particular content posting entity and the content follower.

9. The method of claim 1, wherein the same predefined set of types of traits describes a specific enterprise by whom both the particular content posting entity and the content follower are employed.

10. The method of claim 1, wherein the same predefined set of types of traits describes a specific project team of which both the particular content posting entity and the content follower are members.

11. The method of claim 1, further comprising:
determining, by one or more processors, that the particular content posting entity and the content follower are currently working on a same project; and
in response to determining that the particular content posting entity and the content follower are currently working on the same project, sending, by one or more processors, content postings from the particular content posting entity to the content follower.

12. The method of claim 1, further comprising:
determining, by one or more processors, that the particular content posting entity and the content follower are currently working together on a same project; and
in response to determining that the particular content posting entity and the content follower are currently working on the same project, blocking, by one or more processors, content postings from the particular content posting entity from being sent to the content follower.

13. The method of claim 1, further comprising:
determining, by one or more processors, that the particular content posting entity and the content follower are not currently working on a same project; and
in response to determining that the particular content posting entity and the content follower are not currently working on the same project, blocking, by one or more processors, content postings from the particular content posting entity from being sent to the content follower.

14. The method of claim 1, further comprising:
determining, by one or more processors, that a frequency at which the particular content posting entity posts content is greater than a predetermined frequency; and
in response to determining that the frequency at which the particular content posting entity posts content is greater than the predetermined frequency, blocking, by one or more processors, any additional content postings from the particular content posting entity for the content follower.

15. The method of claim 1, further comprising:
determining, by one or more processors, that a frequency at which the particular content posting entity posts content is less than a predetermined frequency; and
in response to determining that the frequency at which the particular content posting entity posts content is less than the predetermined frequency, blocking, by one or more processors, any additional content postings from the particular content posting entity for the content follower.

16. The method of claim 1, further comprising:
determining, by one or more processors, a physical distance between the content follower and the particular content posting entity; and
in response to determining that the physical distance between the content follower and the particular content posting entity is within a predetermined distance, automatically blocking, by one or more processors, future content postings from the particular content posting entity to the content follower.

17. The method of claim 1, further comprising:
determining, by one or more processors, that the particular content posting entity is posting from a particular building; and
in response to determining that the particular content posting entity is posting from the particular building, continuing, by one or more processors, said automatically retrieving of the content postings from the particular content posting entity for the content follower.

18. A computer program product for enabling a user to selectively follow content postings from a content posting entity, the computer program product comprising a computer readable storage medium having program code embodied therewith, the program code readable and executable by one or more processors to perform a method comprising:
comparing a particular content posting entity's traits of a particular content posting entity to a content follower's traits of a content follower, wherein the particular content posting entity's traits and the content follower's traits describe a same predefined set of types of traits;
in response to the particular content posting entity's traits matching the content follower's traits at within a predefined matching level range, automatically retrieving content postings from the particular content posting entity for the content follower, and
transmitting the content postings from the particular content posting entity to a computer system that is used by the content follower.

19. The computer program product of claim 18, wherein the content postings are publicly broadcast content from radio broadcasts.

20. A computer system comprising:
a processor, a computer readable memory, and a computer readable storage medium;
first program instructions to compare a particular content posting entity's traits of a particular content posting entity to a content follower's traits of a content follower, wherein the particular content posting entity's traits and the content follower's traits describe a same predefined set of types of traits;
second program instructions to, in response to the particular content posting entity's traits matching the content follower's traits within a predefined matching level range, automatically retrieve content postings from the particular content posting entity for the content follower; and
third program instructions to transmit the content postings from the particular content posting entity to a computer system that is used by the content follower; and
wherein the first, second, and third program instructions are stored on the computer readable storage medium for execution by the processor via the computer readable memory.

\* \* \* \* \*